(12) United States Patent
Ryntz et al.

(10) Patent No.: US 6,391,461 B1
(45) Date of Patent: May 21, 2002

(54) ADHESION OF PAINT TO THERMOPLASTIC OLEFINS

(75) Inventors: Rose Ann Ryntz, Clinton Township; Jack Fe-de Chu, Canton, both of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/138,910

(22) Filed: Aug. 24, 1998

(51) Int. Cl.$^7$ .............................................. B32B 27/32
(52) U.S. Cl. .............................. 428/424.8; 428/423.1; 428/424.2; 428/483; 428/515; 428/520; 427/407.1; 427/412.3
(58) Field of Search .................. 428/480, 483, 428/500, 515, 423.1, 424.2, 424.8, 520; 525/74, 78, 80, 374, 379; 524/394, 401, 414, 418, 428, 504, 582, 585; 427/407.1, 412.3

(56) References Cited

U.S. PATENT DOCUMENTS

| | | |
|---|---|---|
| 4,064,315 A | 12/1977 | Bivans et al. |
| 4,416,944 A | 11/1983 | Adur |
| 4,822,688 A | 4/1989 | Nogues |
| 4,999,403 A | 3/1991 | Datta et al. |
| 5,001,197 A | 3/1991 | Hendewerk |
| 5,091,469 A | 2/1992 | Miller et al. |
| 5,213,901 A | 5/1993 | Ingle |
| 5,230,963 A | 7/1993 | Knoerzer |
| 5,248,364 A | 9/1993 | Liu et al. |
| 5,281,670 A | 1/1994 | Lee et al. |
| 5,424,362 A | 6/1995 | Hwang et al. |
| 5,432,230 A | 7/1995 | Vanderbilt et al. |
| 5,484,838 A | 1/1996 | Helms et al. |
| 5,510,180 A | 4/1996 | Liu et al. |
| 5,621,041 A | 4/1997 | Baird et al. |
| 5,693,710 A | * 12/1997 | Srinivasan et al. ............ 525/63 |
| 5,695,838 A | 12/1997 | Tanaka et al. |
| 5,709,909 A | * 1/1998 | Leibfarth et al. ........ 427/407.1 |
| 5,721,315 A | * 2/1998 | Evans et al. ................... 525/74 |
| 5,750,627 A | * 5/1998 | St. Clair ..................... 525/162 |
| 5,777,022 A | * 7/1998 | Bugajski et al. ............. 524/527 |
| 5,783,630 A | * 7/1998 | Evans et al. ................... 525/74 |
| 5,925,724 A | * 7/1999 | Cenens et al. ................ 528/85 |
| 5,959,015 A | * 9/1999 | Helms et al. ................ 524/394 |
| 5,959,030 A | * 9/1999 | Berta ........................... 525/64 |
| 5,962,573 A | * 10/1999 | Berta ........................... 524/487 |
| 5,965,667 A | * 10/1999 | Evans et al. ................... 525/74 |
| 5,985,999 A | * 11/1999 | Dominguez et al. .......... 525/74 |

FOREIGN PATENT DOCUMENTS

| | | |
|---|---|---|
| EP | 0 634 424 B1 | 5/1997 |
| WO | WO 97/03108 | 1/1997 |
| WO | WO 97/35936 | 10/1997 |

\* cited by examiner

*Primary Examiner*—Paul Thibodeau
*Assistant Examiner*—Monique R. Jackson
(74) *Attorney, Agent, or Firm*—Larry I. Shelton

(57) ABSTRACT

A method improving paint adhesion to thermoplastic olefins. The method comprises providing a thermoplastic olefin prepared from a TPO blend comprising maleated polypropylene and amine-terminated polyether. A paint is provided comprising a base paint and a paint adhesion promoter selected from the group consisting of a chlorinated polyolefin, a hydrogenated poly(butadiene)diol, and mixtures thereof. The paint is applied to the thermoplastic olefin.

18 Claims, No Drawings

ADHESION OF PAINT TO THERMOPLASTIC OLEFINS

TECHNICAL FIELD

The invention is directed to a method of improving paint adhesion to thermoplastic olefins.

BACKGROUND OF THE INVENTION

Thermoplastic olefins (TPOs), which typically comprise polypropylene and an elastomer, have many desirable properties, e.g., light weight, durability, low cost, etc., that make them an attractive material of construction for many interior and exterior automotive parts. However, because of their relatively non-polar nature, TPOs do not readily accept paint. Most paints are polar, and thus require a surface with some degree of polarity before it can adhere to the surface with any degree of desirable fastness.

In the past, this problem has been addressed from a number of different directions. One typical and relatively effective method of applying a paint to a relatively low flexural modulus TPO is to first apply a primer to the TPO before applying the paint. Primers, while effective, do add an additional step in the finishing of TPO articles.

In an attempt to reduce costs of automotive parts manufactured from TPOs, high flexural modulus TPOs (flexural modulus above about 1000 MPa) have replaced lower flexural modulus TPOs. In employing the use of high flexural modulus TPO over lower flexural modulus TPOs, a raw materials cost savings can be realized since the part may be made thinner than if made with a low flexural modulus TPO due to the increased relative flexural moduli of the TPOs. However, the paintability of the TPOs typically decrease as flexural modulus increases. Accordingly, the application of a primer to high flexural modulus TPOs has resulted in a relatively moderate paint adhesion level.

Accordingly, it would be desirable to provide a method of improving paint adhesion to TPOs in general and in particular, to high flexural modulus TPOs. It would also be desirable to be able to directly adhere paint to TPOs, and to high flexural modulus TPOs, without requiring the application of a primer to the TPOs.

DISCLOSURE OF THE INVENTION

The present invention relates to a method of improving paint adhesion to thermoplastic olefins (TPOs). The method comprises providing a TPO prepared from a TPO blend comprising maleated polypropylene and amine-terminated polyether. The method further comprises providing a paint having a paint adhesion promoter selected from the group consisting of a chlorinated polyolefin, an olefinic diol, and mixtures thereof. The method further includes applying the paint to the TPO.

DETAILED DESCRIPTION OF THE PREFERRED EMBODIMENTS

The present invention provides a method of improving paint adhesion to TPOs and is particularly well suited for improving paint adhesion to TPOs having a high flexural modulus. TPOs having a "high flexural modulus" are TPOs which have a flexural modulus above about 1000 MPa.

High flexural modulus TPOs are able to be manufactured by known methods such as extrusion, and can be formed into components, by known methods, such as, injection molding, blow molding, compression molding, and extrusion molding, which may be painted as desired.

The TPOs for use with the method of the present invention are modified TPOs. Modified TPOs are prepared from a TPO blend modified by the addition of maleated polypropylene and amine-terminated polyether.

While the method of the present invention provides improved paint adhesion for modified TPOs in general, the method of the present invention has been found to work particularly well with modified high flexural modulus TPOs comprising the reaction product of a blend of the following four components: (a) polypropylene, (b) maleated polypropylene, (c) elastomer, and (d) amine-terminated polyether (Jeffamine) which is a linear or branched polymer of oxypropyleneamine or oxyethyleneamine repeating units. Polyoxyethyleneamine has the chemical formula: $NH_2CH(CH_3)CH_2-(OCH_2CH_2)_n-NH_2$ and polyoxypropyleneamine has the chemical formula: $NH_2CH(CH_3)CH_2-(OCH_2CH(CH_3))_n-NH_2$. The amine-terminated polyether has about 10–50 repeating units (i.e., n= about 10–50). In forming the modified TPO, the four above discussed polymers will be reacted. An example of an amine-terminated polyether usable with the present invention is Jeffamine XTJ-418 from Huntsman Chemical Co. of Houston, Tex.

One reaction which is believed to take place during compounding is between a slight excess of the amine-terminated polyether and the maleated polypropylene, i.e., when the amine-terminated polyether is grafted to the polypropylene. That is the amine end-group of one mole of the amine-terminated polyether reacts with the maleic anhydride functionality of about 1.01 to 1.05 mole of the maleated polypropylene. As is known in the art, a maleated polypropylene has the general chemical formula: $CH_3CH_2CH_2-(CH(CH_3)CH_2C_4H_3O_3)_n-$ with a number average molecular weight of about 10,000 to 60,000, a viscosity of about 35–250 cps at 160° C., a density of about 0.88–0.93 g/cm$^3$, and an acid number of 10–45. An example of a maleated polypropylene usable with the present invention is E-43 from Eastman Chemical Co. of Kingsport, Tenn.

Generally, formation of the grafted amine-terminated polyether would take place during mixing of the components in an extruder, but alternatively can be done off-line if it is desired to first separately graft the amine-terminated polyether to the maleated polypropylene. If the latter is carried out, i.e., off line, this grafted amine-terminated polyether would then be compounded with the last two components, the polypropylene and the elastomer, during processing as by extrusion.

Examples of the polypropylene used in the present invention are Exxon Chemical Company Escorene 1042 with a density of about 0.905 g/cm$^3$, melt flow rate of about 1.9 dg/10 min, Mn of approximately 67,070, Mw/Mn equal to about 3.51, and flexural modulus equal to about 1240 MPa and Escorene 1105 with a density of about 0.906 g/cm$^3$, melt flow rate equal to about 34 dg/10 min, Mn of approximately 48,021, Mw/Mn equal to about 2.58, and a flexural modulus of about 1170 MPa. The fourth polymeric component used to form the TPO is an elastomer, such as Exxon Chemical Company Exact 4033, 3125, and/or 3022 (ethylene-butylene copolymers) having densities of about 0.88 to 0.91 g/cm$^3$, melt flow rates of about 1.2 to 9.0 dg/10 min, number average molecular weights of about 23,000 to 50,500, and a Mw/Mn of about 1.95 to 2.65.

Generally, the blends of the four polymeric materials used to form the modified TPO of the present invention comprise, based on the total weight of the blend, about 60 to 90 weight percent polypropylene, about 5 to 15 weight percent maleated polypropylene, 0 to about 6 weight percent amine terminated polyether, and 0 to about 30 elastomer. More preferred are blends with about 65 to 75 weight percent polypropylene, about 10 to 12 weight percent maleated polypropylene, about 4 to 5 weight percent amine-terminated polyether with ethylene oxide repeat units, and about 10 to 20 weight percent ethylene-butylene copolymer elastomer, based on the total weight of the blend. Elastomer content is largely dependent on the required modulus of the TPO formed from the resulting blend, with lower elastomer content being necessary for stiffer materials. The elastomer content of TPO's having a flexural modulus above about 1000 MPa must be below at least about 30 weight percent based on the total weight of the blend prepared for making the TPO.

As would be apparent to those skilled in the art of making plastic materials, other additives such as stabilizers may be included in polymer blends during processing and for long term photochemical stability. For example, such conventionally added materials may include, but are not limited to antioxidants such as sterically hindered phenols, phosphites, phosphonites, sterically hindered amine light stabilizers, and ultraviolet light-absorbers. Additionally, the addition of internal mold release agents such as metal stearates, fatty and wax acids, amides, or esterified polyol esters and lubricants such as thioesters, low molecular weight olefinic waxes, glycerol monostearate or ethyoxylated fatty amines may be used as processing aides.

The paint of the present invention for use with TPOs, and particularly with the TPOs described above, is a solvent borne base paint modified with a paint adhesion promoter selected from the group consisting of a chlorinated polyolefin, an olefinic diol, and mixtures thereof. By terms "a" and "an" as used herein with respect to a component, or class of components, of the paint, it is meant "one or more". For example, the term "chlorinated polyolefin" means that minimally one chlorinated polyolefin is present in the paint with two or more chlorinated polyolefins being optionally present in the paint.

The paint adhesion promoter is present in the paint of the present invention in an amount of about 5 to 30 weight percent solids, based on the total weight of the solids of the paint when wet, and more preferably, about 10 weight percent solids. The paint of the present invention may include, besides the base paint and the paint adhesion promoter, other known paint components such as pigments.

The base paint may be any solvent borne paint known in the art useable for painting plastic or metallic substrates. A particularly preferred base paint is a two component urethane paint such as the 206LE paint from Red Spot Paint and Varnish Co., Inc. of Evansville, Ind.

The chlorinated polyolefin preferably has a number average molecular weight of between about 10,000 to 80,000, and most preferably between about 10,000 and 25,000. The chlorinated polyolefin preferably has a chlorine content of between about 10 to 25 weight percent, based on the weight of the chlorinated polyolefin.

The chlorinated polyolefin preferably has a polypropylene backbone with chlorine grafted thereto. The polyolefin backbone may also be modified by grafting relatively small amounts of other constituents, such as maleic anhydride, thereto.

Preferred chlorinated polyolefins includes, but are not limited to, Hardlen's CY9122, MN21P, HM23P of Hardlen, Co., of Japan, and Eastman's 343 and 164 of Eastman Chemical Co. of Kingsport, Tenn.

The olefinic diol is preferably a hydrogenated poly (butadiene)diol and preferably has a number average molecular weight of between about 2,500 to 15,000. Preferred hydrogenated poly(butadiene)diols include, but are not limited to, the Kraton Liquid® series, and preferably Kraton Liquid® L-2203 from Shell Chemical Co. of Houston, Tex.

To prepare the paint for use with the present invention, the paint adhesion promoter is added to the base paint and mixed until a uniform paint is obtained. If a pigment is to be added to the paint, it is preferred that the paint adhesion promoter and the pigment be mixed together first, with the resulting mixture then being added to the paint.

The resulting paint can then be applied directly to a substrate formed of high flexural modulus TPO in any suitable manner known in the art such as by spraying.

The paint of the present invention, when applied to high flexural moduli TPOs, typically has a %-paint adhesion of between about 90% to about 100%.

The following examples are meant to describe preferred embodiments of the present invention.

EXAMPLE 1

A modified TPO was prepared by cold blending a mixture of about 69 weight percent Escorene 1042 PP (polypropylene) and about 17 weight percent Exact 4403 EB (elastomer) in a Werner Pfleiderer twin screw extruder. About 4 weight percent Jeffamine XTJ-418 and about 10 weight percent Eastman E-43 maleated PP were added into a separate port of the extruder to form a modified TPO. The Jeffamine mixture was added to the molten PP/EB melt as it progressed through the extruder. The extrusion temperatures were maintained at about 200–220° C. The modified TPO was cooled in a water bath and pelletized as it came through the extruder. The resulting pellets were then injection molded into about 4"×12" plaques.

The paint of the present invention was prepared by adding a mixture of Kraton Liquid® L-2203 and white $TiO_2$ pigment to Red Spot 206LE two-component urethane solvent based clear paint to allow about 10 wt % solids of the total wet paint solids to be Kraton Liquid® L-2203.

A prior art paint was preferred having essentially the same composition of the paint of the present invention except that no Kraton Liquid® L-2203 was added.

Each of the paints was spray applied to modified TPO plaques (total film thickness 25 microns) and baked about 30 minutes at about 121° C. Following about a 72 hour post-cure at room temperature, the painted plaques were checked for paint adhesion, via a cross-hatch tape pull (FLTM BI 106-01, Method D), and thermal shock resistance (FLTM BI 107-05). The results are displayed below in Table 1.

TABLE 1

| PAINT/TPO | % PAINT ADHESION | THERMAL SHOCK* |
|---|---|---|
| Prior Art/Modified | 80 | 15 |
| Present Invention/Modified | 100 | 20 |

EXAMPLE 2

Plaques were prepared in the same manner described above in Example 1 from prior art TPO (unmodified) pellets comprising about 80 weight percent Escorene 1042 pp and about 20 weight percent Exact 4403 EB. Some of the prior art TPO plaques were sprayed with the prior art paint described in Example 1 while other prior art TPO plaques were sprayed with the paint of the present invention described in Example 1. The prior art TPO painted plaques were checked for paint adhesion in the same manner described above in Example 1. The results are displayed below in Table 2.

TABLE 2

| PAINT/TPO | % PAINT ADHESION | THERMAL SHOCK* |
|---|---|---|
| Prior Art/Prior Art | 0 | 0 |
| Present Invention/ Prior Art | 80 | 10 |

As can be seen from the above example, the paint adhesion and thermal shock with respect to TPOs can be improved by employing the modified TPOs and paint of the present invention.

While the best modes for carrying out the invention have been described in detail, those familiar with the art to which the invention relates will appreciate other ways of carrying out the invention defined by the following claims.

What is claimed is:

1. A method of improving paint adhesion to thermoplastic olefins, said method comprising:
    providing a thermoplastic olefmn prepared from a TPO blend comprising polylpropylene, elastomer, maleated polypropylene and amine-terminated polyether, said thermoplastic olefin having a flexural modulus above 1,000 MPa;
    providing a paint comprising a base paint and a paint adhesion promoter selected from the group consisting of a chlorinated polyolefin, a hydrogenated poly(butadiene)diol, and mixtures thereof; and
    applying said paint to said thermoplastic olefin.

2. The method of claim 1 wherein said amine-terminated polyether is selected from the group consisting of linear or branched polymer of oxypropyleneamine and oxyethyleneamine.

3. The method of claim 1 wherein said polypropylene is present in said blend in an amount of from about 60 to 90 weight percent, said maleated polypropylene is present in said blend in an amount of from about 5 to 15 weight percent, said elastomer is present in said blend in an amount of from 5 to about 30.0 weight percent, and said amine-terminated polyether is present in said blend in an amount of from 2 to about 6 weight percent, based on the weight of said blend.

4. The method of claim 1 wherein said paint adhesion promoter is present in said paint in an amount of from about 5 to 30 weight percent solids, based on the total solids weight of said wet paint.

5. The method of claim 4 wherein said adhesion promoter comprises chlorinated polyolefin with said chlorinated polyolefin comprising from about 10 to 25 weight percent chlorine, based on the weight of the chlorinated polyolefin.

6. The method of claim 1 wherein said adhesion promoter comprises chlorinated polyolefin with said chlorinated polyolefin comprising from about 10 to 25 weight percent chlorine, based on the weight of the chlorinated polyolefin.

7. The method of claim 6 wherein said paint adhesion promoter further comprises hydrogenated poly(butadiene) diol.

8. The method of claim 1 wherein said paint adhesion promoter comprises a hydrogenated poly(butadiene)diol.

9. The method of claim 1 wherein said paint has a % paint adhesion of at least about 90% to said thermoplastic olefin.

10. The method of claim 1 wherein said TPO blend comprises a compounded TPO blend.

11. A painted thermoplastic olefin comprising:
    a thermoplastic olefin prepared from a TPO blend comprising polypropylene, elastomer, maleated polypropylene and amine-terminated polyether, said thermoplastic olefin having a flexural modulus above 1.000 MPa,
    said thermoplastic olefin having adhered thereto a paint comprising a base paint and a paint adhesion promoter selected from the group consisting of a chlorinated polyolefin, an olefinic diol, and mixtures thereof.

12. The thermoplastic olefin of claim 11 wherein said amine-terminated polyether is selected from the group consisting of linear or branched polymers of oxypropyleneamine and oxyethyleneamine.

13. The thermoplastic olefin of claim 11 wherein said polypropylene is present in said blend in an amount of from about 60 to 90 weight percent, said maleated polypropylene is present in said blend in an amount of from about 5 to 15 weight percent, said elastomer is present in said blend in an amount of from 5 to about 30.0 weight percent, and said amine-terminated polyether is present in said blend in an amount of from 2 to about 6 weight percent, based on the weight of said blend.

14. The thermoplastic olefin of claim 11 wherein said adhesion promoter comprises chlorinated polyolefin with said chlorinated polyolefin comprising from about 10 to 25 weight percent chlorine, based on the weight of said chlorinated polyolefin.

15. The thermoplastic olefin of claim 14 wherein said paint adhesion promoter further comprises hydrogenated poly(butadiene)diol.

16. The thermoplastic olefin of claim 11 wherein said paint adhesion promoter comprises a hydrogenated poly(butadiene)diol.

17. The thermoplastic olefin of claim 11 wherein said paint has a % paint adhesion to said article of at least about 90%.

18. The thermoplastic olefin of claim 11 wherein said TPO blend comprises a compounded TPO blend.

* * * * *